(12) United States Patent
Desorbo

(10) Patent No.: US 7,986,367 B2
(45) Date of Patent: Jul. 26, 2011

(54) CAMERA SYSTEM AND POWER SUPPLY FOR OPTICAL RECORDING DEVICES

(75) Inventor: Alexander P. Desorbo, Woodbury, CT (US)

(73) Assignee: Anton/Bauer, Inc., Shelton, CT (US)

( * ) Notice: Subject to any disclaimer, the term of this patent is extended or adjusted under 35 U.S.C. 154(b) by 0 days.

(21) Appl. No.: 12/756,536

(22) Filed: Apr. 8, 2010

(65) Prior Publication Data

US 2010/0195987 A1 Aug. 5, 2010

Related U.S. Application Data

(62) Division of application No. 11/410,799, filed on Apr. 24, 2006, now Pat. No. 7,724,303.

(60) Provisional application No. 60/716,017, filed on Sep. 9, 2005, provisional application No. 60/716,625, filed on Sep. 13, 2005.

(51) Int. Cl.
*H04N 5/225* (2006.01)
*H02J 7/00* (2006.01)
*H01M 2/10* (2006.01)

(52) U.S. Cl. ........ 348/372; 320/107; 320/113; 320/115; 429/96

(58) Field of Classification Search ............. 348/207.99, 348/372–376; 248/187.1; 320/107, 112–115; 429/96–100
See application file for complete search history.

(56) References Cited

U.S. PATENT DOCUMENTS

| 4,057,816 | A | 11/1977 | Killian, Jr. et al. |
| 5,222,826 | A | 6/1993 | Hanke |
| 5,809,355 | A * | 9/1998 | Lungershausen et al. .... 396/319 |
| 6,364,259 | B1 * | 4/2002 | Boudard .................... 248/187.1 |
| 6,779,932 | B2 * | 8/2004 | DeSorbo et al. .............. 396/419 |
| 7,042,499 | B1 | 5/2006 | Kido et al. |
| 2003/0048365 | A1 | 3/2003 | Saito et al. |
| 2004/0076875 | A1 * | 4/2004 | Maggert et al. ............... 429/123 |
| 2006/0093345 | A1 * | 5/2006 | Jan ................................ 396/278 |

FOREIGN PATENT DOCUMENTS

| JP | S63-060434 | 3/1988 |
| JP | 2000-002927 | 1/2000 |

* cited by examiner

*Primary Examiner* — Lin Ye
*Assistant Examiner* — Richard Bemben
(74) *Attorney, Agent, or Firm* — McCormick, Paulding & Huber LLP

(57) ABSTRACT

A camera system includes a video camera having a first mating mechanism defined on a bottom, planar surface of the video camera. A battery assembly contains an energy cell and a first surface of the battery assembly is releasably engageable with the mounting mechanism such that the battery assembly is suspended beneath the video camera, with the bottom, planar surface of the video camera in substantial contact with the first surface. A support apparatus having a second mating mechanism is also provided, the second mating mechanism releasably engaging a second surface of the battery assembly.

3 Claims, 11 Drawing Sheets

CAMERA SYSTEM AND POWER SUPPLY FOR OPTICAL RECORDING DEVICES

CROSS-REFERENCE TO RELATED APPLICATIONS

This application claims the benefit of U.S. Provisional Application No. 60/716,017, filed Sep. 9, 2005, entitled "BATTERY MOUNTING SYSTEM" and U.S. Provisional Application No. 60/716,625, filed Sep. 13, 2005, entitled "BATTERY MOUNTING SYSTEM", and is a divisional of co-pending U.S. patent application Ser. No. 11/410,799 filed on Apr. 24, 2006, each of the aforementioned applications being hereby incorporated by reference in their entireties.

FIELD OF THE INVENTION

This invention relates, in general, to an ergonomic camera system and power supply for optical recording devices, and deals more particularly with a method and apparatus for providing increased power capability and operability to video cameras.

BACKGROUND OF THE INVENTION

Technological advances in recording digital video, recording media, and electronics have led to video cameras of smaller size and weight. These smaller "hand-held" video cameras are replacing "shoulder mounted" video cameras of nearly 6 times the volume and weight. A typical "handheld" video camera is designed to operate with one hand, thus freeing the operator from a bulky load on his shoulder.

However, the power requirements of these handheld video cameras have not been reduced in similar proportions to their reduction in size and weight. Indeed, today's video cameras commonly require 50% of the power that earlier cameras 600% larger would consume. The batteries generally provided with these cameras are physically small, limited in their ability to power the cameras for extended periods of time and are generally considered unreliable for long service life or professional use. Many of these batteries were designed for the intermittent duty of a consumer camera and are included with professional video cameras primarily to reduce the overall manufactured cost.

The batteries included with known handheld video cameras often define a footprint (length and width) for their mounting means that is itself small in area, and therefore only allows for extending the battery outwardly from the camera body, resulting in an awkward and mostly unusable dimension. Also, the footprint does not allow for the increase in the size of the cells used in the battery. Therefore, improving the performance or quality of the battery is virtually impossible.

The reduction in size and weight of known handheld video cameras also creates a problem in the physics behind the ability of a pan and tilt head to properly control the movement of the camera. As the camera mass is lessened, the ability of the head to dampen unwanted movements made by the operator is also lessened. Moreover, the lightweight of smaller video cameras actually requires at least as heavy a tripod base in order to provide a stable shooting platform.

Thus, the reduction in size and weight of handheld cameras has caused a problem for both the power source and the stabilizing devices typically used, especially by professionals, to operate the camera to generate quality video productions. Ironically, both designers of stabilizing devices and designers of power sources have been forced to add at least as much weight to the operating system—camera, battery, head and tripod—as the camera manufacturer eliminated in reducing the size and overall weight of video camera devices in the first place.

Numerous stabilizing devices have been developed for these handheld video cameras. These devices typically add to the operators weight burden both in camera operation and in the weight of gear necessary to carry to a location. These devices are often awkward and mitigate the size and weight benefits, and operating convenience, that small cameras were intended to offer.

Still further, the reduction in the size of the camera body has left little room to add or attach accessory devices. Virtually every square inch of the outer surfaces of the video camera are dedicated to some functional aspect—lens, input, output connectors, viewfinders, LCD monitors, handle and media compartments.

Classically, there is one notable exception to the use of a video camera body surface for functional operations. The base, or bottom, planar surface, of known video cameras are left relatively flat and absent of any function other than to provide a mounting surface for a pan and tilt head, tripod or the like.

Conversely, in still image cameras it has been known to locate a battery accessory beneath the base of the still camera, however the use of the bottom surface of video cameras has, to date, been stringently avoided both by video camera and accessory designers in order to not interfere with the mounting of the video camera to a support device, such as a tripod. That is, the still photography field is substantially different from the motion or video camera field in that still photography is traditionally effected by hand-held means, without the need for tripods or the like. While still photography cameras are themselves oftentimes provided with a threaded bore for optional mounting upon a tripod or the like, the adaptation of a base-mounted battery for still photography cameras gained limited appeal because their hand-held use so rarely entails the need for a tripod that the threaded bore typically went unutilized in any event.

In stark contrast, video cameras are typically heavier then still photography cameras, are more susceptible to the detrimental effects of image shake and are typically utilized to record during movement, such as during sporting events, television news programming or in the professional photography arena. For these reasons, video cameras typically employ tripods, or the like, over a significant portion of their working life, therefore designers and manufactures have never imported the teachings of the still photography art in this regard.

With the forgoing problems and concerns in mind, it is the general object of the present invention to provide a battery assembly with increased functionality that increases the total power available to an electronic consumer, while also boosting operability and improving the ergonomics of the electrical consumer. In particular, it is the general object of the present invention to provide a power supply for video cameras that utilizes the bottom, planar surface of the video camera, without impeding the functionality of the bottom, planar surface.

SUMMARY OF THE INVENTION

It is an object of the present invention to provide a portable power supply for an optical recording device.

It is another object of the present invention to provide a portable power supply for a video camera.

It is another object of the present invention to provide a portable power supply for a video camera in the form of a battery (or collection thereof), a fuel cell or a combination of the two.

It is another object of the present invention to provide a portable power supply for a video camera that utilizes the bottom, planar surface of the vide camera for mounting thereon.

It is yet another object of the present invention to provide a battery assembly having a housing that defines a first structural platform for mounting to a support device, such as a pan and tilt head/tripod.

It is yet another object of the present invention to provide a battery assembly having a housing that defines a second structural platform for mounting to the bottom plane of a camera apparatus.

It is yet another object of the present invention to provide a battery assembly which may be selectively detached from the video camera, in a quick-release fashion, without the need for specialized tools.

It is yet another object of the present invention to provide a battery assembly that is selectively and releasably connected to a pan and tilt head/tripod, integrating one of several common mechanical mounting connection means in the housing of the battery.

It is yet another object of the present invention to provide a battery assembly that may be releasably mounted between the bottom, planar surface of a video camera and a pan and tilt head/tripod, wherein the battery assembly may be selectively replaced without mechanically decoupling the video camera from its pan and tilt head/tripod.

It is yet another object of the present invention to provide a battery assembly having electrical contacts formed thereon for communication with matching electrical contacts formed on the bottom planar surface of the video camera, thereby providing electrical energy from the battery to the video camera.

It is yet another object of the present invention to provide a battery assembly having a power take-off aperture formed thereon for providing electrical energy from the battery to the video camera via an electrical cord, or the like.

It is yet another object of the present invention to provide a battery assembly for an optical recording device that improves the weight distribution of an optical recording device.

It is yet another object of the present invention to provide a battery assembly that improves the ergonomics of an electrical device.

These and other objectives of the present invention, and their preferred embodiments, shall become clear by consideration of the specification, claims and drawings taken as a whole.

DETAILED DESCRIPTION OF THE PREFERRED EMBODIMENT

Known video cameras, both the hand-held variety and the larger, professional video cameras, are known to have a bottom, planar surface that is devoid of any structural or operational features, with the exception of a threaded bore and a positioning hole. It is also well known that the threaded bore and positioning hole that are defined on the bottom, planar surface of typical video cameras are utilized to mount the video cameras to pan and tilt heads/tripods. In practice, known pan and tilt heads/tripods are themselves equipped with a threaded stud, or the like, for selective and threaded engagement with the video camera's threaded bore, as well as having a location post for engagement with the positioning hole.

Despite the advancements in the video camera art over the years, which have added an ever-increasing host of additional features to video cameras, such as flip-out observation/preview screens, a plurality of editing buttons and the like, it will therefore be readily appreciated that manufacturers of known video cameras have assiduously avoided defining any of these additional features on the bottom, planar surface of the video camera.

Indeed, the rationale for keeping the bottom, planar surface of video cameras sacrosanct in this regard is well appreciated in the art. Video cameras that are not mounted to pan and tilt heads/tripods are frequently rested on their bottom, planar surface, thus any functional buttons or screens would be inaccessible (and subject to incident damage) if they were formed thereon. Moreover, especially in the professional video recording art, video cameras are almost universally mounted atop known pan and tilt heads/tripods during use, therefore keeping the bottom, planar surface free of extraneous structures was of immense importance.

Owing to this known and universal ban on the development of the bottom, planar surface of video cameras to date, manufactures of accessory devices, including battery manufacturers, have sought to utilize the other surfaces of video cameras to mount their devices thereon. Thus, and in particular, battery manufacturers have sought to develop battery assemblies that extend outwardly from the back or side panels of video cameras, sometimes extending a great distance therefrom.

It will therefore be readily appreciated that the suspension of weighty battery assemblies some distance away from the rear, or side, panels of known video cameras is not only cumbersome to the user, but also produces a net moment to the video camera itself, hampering both stability and shake control and further fatiguing the user.

The present invention seeks to address these shortcomings, while not limiting or adversely affecting the ability of video cameras to mount to pan and tilt heads/tripods (hereinafter generally referred to as 'tripods'), or affecting their ability to be rested on their bottom, planar surface during use or storage.

Figure 1:
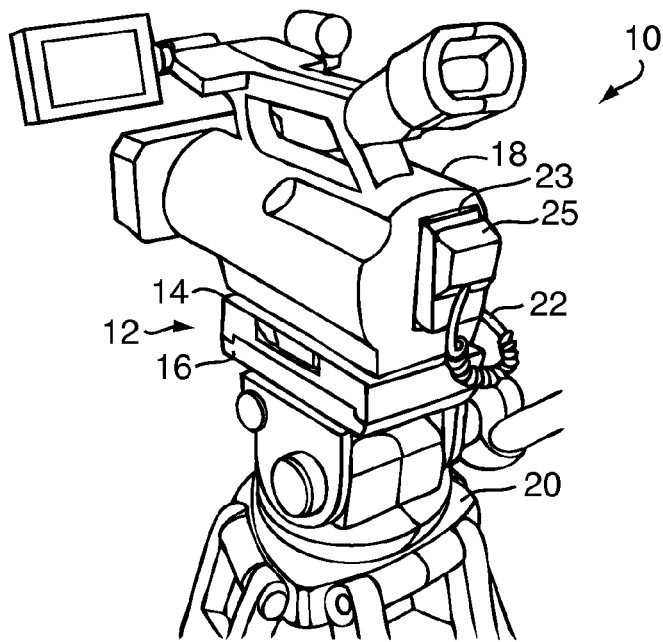
FIG. 1 illustrates a video camera assembly according to one embodiment of the present invention.

FIG. 1 illustrates a video camera assembly 10 according to one embodiment of the present invention. As can be seen in FIG. 1, the video camera assembly 10 includes a battery assembly 12 having a housing comprised of an upper first half 14 and a lower bottom half 16. Together, the matable upper half 14 and lower half 16 define an inner chamber for accommodating one or more energy cells therein. A printed circuit board may also be located within the inner chamber, and operatively connected to the energy cells, to be utilized in a known fashion to assist in the management of the power cells, or the like.

In accordance with the present invention, the energy cells are preferably rechargeable lithium ion batteries, or the like, however the present invention is not so limited in this regard as the energy cells may alternatively be any type or manner of portable power cells without departing from the broader aspects of the present invention.

Returning to FIG. 1, the battery assembly 12 is selectively and releasably connected between a video camera 18 and a tripod assembly 20. The video camera 18 shown in FIG. 1 may be any of the various known video cameras available on the market today, and includes an unillustrated threaded bore and a positioning hole formed in the bottom planar surface of the video camera 18, as is known in the art.

The precise manner in which the battery assembly 12 is selectively and releasably mounted to both the video camera 18 and the tripod assembly 20 will be described in more detail later, however it will be readily appreciated that the positioning of the battery assembly 12 beneath the bottom, planar surface of the video camera 18 represents an arrangement heretofore unknown in the art.

It is therefore an important aspect of the present invention that by operatively connecting the battery assembly 12 to the bottom, planar surface of the video camera 18, the present invention greatly increases the ergonomic configuration of the camera assembly 10 as a whole. That is, by locating the weight of the battery assembly 12 directly beneath the video camera 18, as opposed to extending outwardly therefrom as in known video camera systems, the present invention avoids the creation of any unintended and undesirable moments to the camera assembly 10. Indeed, the weight of the battery assembly 12 works in concert with the attachment mechanisms (to be described in more detail later) to seat the video camera 18 even more firmly and with greater stability than would otherwise be possible if the battery assembly 12 were extending outwardly from the video camera 18.

Figure 2:
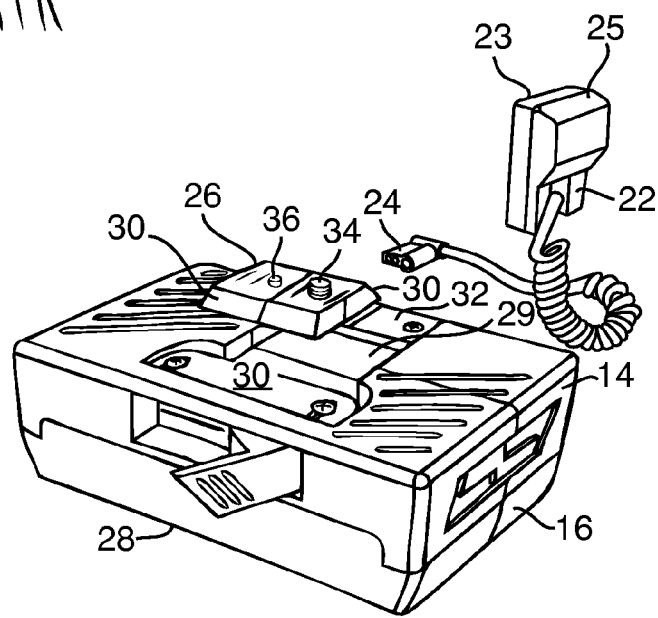
FIG. 2 illustrates a battery assembly and camera mount for use with the video camera assembly of FIG. 1.

Also shown in FIG. 1 is a power adapter and cord 22, which is operatively and electrically connected between the video camera 18 and the battery assembly 12, and provides operating power from the battery assembly 12 to the video camera 18 and its various accessories. As shown in FIG. 2, the power adapter and cord 22 includes a right angle connector 24 for effectuating the electrical connection with the battery assembly 12. It will readily be appreciated that the right angle connector 24 resists disengagement from the housing of the battery assembly 12 should the power adapter and cord 22 be pulled via its cord portion.

The power adapter and cord 22 of the present invention is adapted to releasably mate to the existing battery terminals typically formed on the back or sides of known video cameras, as illustrated in FIG. 1. Moreover, the housing of the power adapter is preferably formed as two halves, a first half 23 and an integrally mated second half 25. The first and second halves, 23 and 25 respectively, may be selectively disengageable from one another, thereby enabling the removal of the second half 25 from the video camera 18 during transportation or the like, while leaving the first half 23 attached to the video camera 18. In this manner, the present invention permits the power cord and adapter 22 to be quickly and easily attached or detached from the video camera 18.

FIG. 2 illustrates a camera mount 26, which is utilized to selectively and releasably connect the battery assembly 12 to the camera assembly 18. As shown in FIG. 2, the camera mount 26 comprises a low-profile plate which may be releasably and securely fixed into a close-fitting depression 29 formed in the upper first half 14 of the battery assembly 12 via the operation of an actuation lever 28. To assist in the selective fixing of the camera mount 26 to the battery assembly 12, the low-profile plate includes chamfered or dove-tailed edges 30 that work in concert with matching edges of a pair of locking plates 32. The locking plates 32 are selectively driven towards one another, via operation of the actuation lever 28, to securely capture the edges 30 of the camera mount 26 therebetween.

While a pair of selectively retractable locking plates 32 have been described, the present invention is not so limited in this regard, as only a single, movable locking plate 32 may be provided, such that the selective movement of the single locking plate effectuates the capturing of the camera mount 26 in the close-fitting depression 29.

It is another important aspect of the present invention that the close-fitting depression 29 is sized to substantially match the thickness of the camera mount 26. That is, when secured within the close-fitting depression 29, the top, exposed surface of the camera mount 26 is substantially flush with the upper first half 14 of the battery assembly 12. Thus, the bottom, planar surface of the video camera 18 enjoys an expansive mounting surface that includes not only the camera mount 26, but also the entire area of the upper first half 14 of the battery assembly 12. Stability and of the video camera 18 is thereby dramatically increased.

As can also be seen in FIG. 2, the camera mount 26 itself includes the same typical mounting apparatus as is commonly found on known tripods, including a threaded stud 34 and a location post 36. It will therefore be readily appreciated that the camera mount 26 may be selectively and releasably connected to the bottom, planar surface of the video camera 18 in the same manner as conventional video cameras are connected to conventional tripods.

Indeed, it is another important aspect of the present invention that the means for attaching the video camera 18 to the battery assembly 12 makes use of the conventional threaded bore formed in the bottom, planar surface of known video cameras, thus making the present invention usable by all known video cameras currently on the market without requiring any structural alteration thereof. Moreover, as the underside of the camera mount 26 is itself a planar surface, any video camera equipped with the camera mount 26 may still be placed upon a support surface, ground or the like, after the camera mount 26 is disengaged from the battery assembly 12 (via operation of the actuation lever 28). Thus, the camera mount 26 of the present invention not only enables the selective mating of the video camera 18 with the battery assembly 12, but does so in a manner that does not destroy the ability of the video camera 18 to be utilized as a stand-alone piece of equipment.

It is still yet another important aspect of the present invention that the camera mount 26 permits the quick-release of the video camera 18 from the battery assembly 12 without the necessity of unscrewing the threaded stud 34. In this regard, it will be appreciated that operation of the actuation lever 28 permits the camera mount 26 to disengage battery assembly 12 in a quick and easy fashion, thus speeding battery replacement time.

Figure 3:
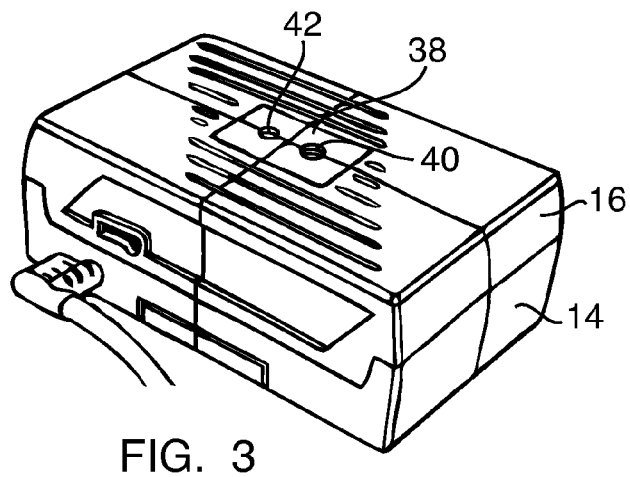
FIG. 3 illustrates the bottom of the battery assembly depicted in FIG. 2.

Turning now to FIG. 3, the lower second half 16 of the battery assembly 12 is now depicted in greater detail. As shown in FIG. 3, the second (or bottom) half 16 of the battery assembly 12 is formed to define a mounting area 38 which, in essence, takes the same form as the known mounting structure typically defined on the bottom of known video cameras. That is, the mounting area 38 also includes a threaded bore 40 and a positioning hole 42 to accommodate the selective and releasable connection to a typical tripod.

It will therefore be readily appreciated from a review of FIGS. 1-3 in combination that the present invention is capable of not only mounting any known video camera to any known tripod assembly in a manner heretofore unknown in the art, but does so in a manner that utilizes the known and unaltered structures of both the video camera 18 and the tripod 20. Moreover, removal of the camera mount 26 and the battery assembly 12 is easily facilitated, and may be readily accomplished if a user desired to mount the video camera 18 directly to the tripod 20.

While the present invention has been described in connection with the specific structures shown in FIGS. 1-3, the camera assembly 10 is not so limited in this regard. That is, instead of the mounting area 38 being formed in the housing of the battery assembly 12 (as shown in FIG. 3), the mounting area may alternatively be formed as a removable plate, similar to the construction and configuration of the camera mount 26. Likewise, there is no necessity for the housing of the battery assembly 12 to be formed in two, top and bottom, halves, nor does the battery assembly 12 need to have any specific shape or design in order to accomplish the present invention. Indeed, the shape and design of the camera mount 26, and of the related locking plates 32, may also take an alternate form without departing from the broader aspects of the present invention.

Figure 4:
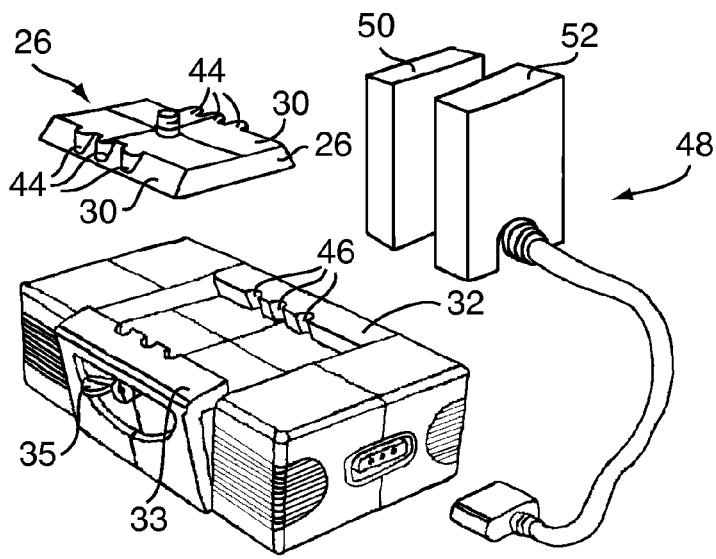
FIG. 4 illustrates a battery assembly and a camera mount, according to another embodiment of the present invention.

FIG. 4 illustrates one such alternative design. As shown in FIG. 4, the camera mount 26 not only includes the dove-tail edges 30, but also defines a plurality of locking hubs 44 for selective engagement with matching receptacles 46 formed in the alternatively configured locking plates 32 and 33. The locking plate 33 is designed to pivot into its locking position and may be secured in this position via the operation of a manual locking lever 35.

Figure 5:
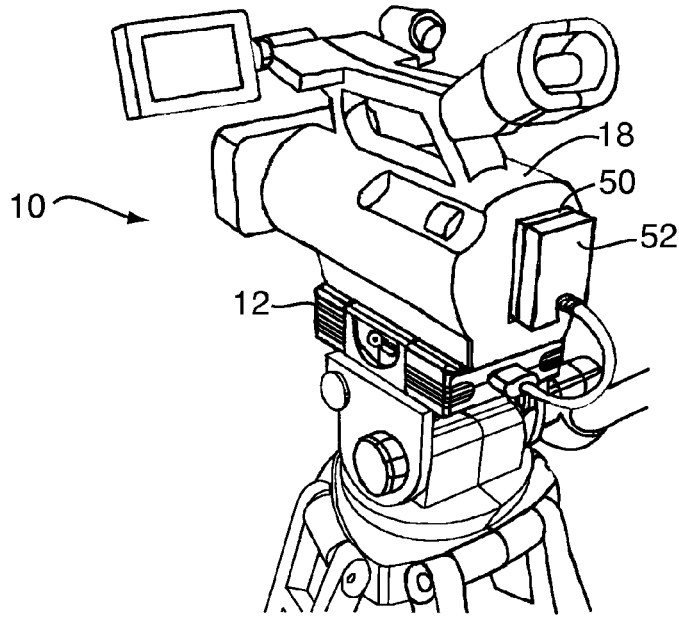
FIG. 5 illustrates is a video camera assembly for use with the battery assembly and camera mount of FIG. 4.

Also illustrated in FIG. 4 is two piece power adapter and cord 48 wherein a first portion 50 of the power adapter is designed to be mounted to known rear battery mounts formed on the video camera 18. The first portion 50 may then be selectively disengaged, via a snap fit or the like, to a second portion 52 of the adapter 48 when it is desired to transport the camera assembly 10 as a whole, and without having to totally disengage the adapter 48 from the battery terminals formed on the video camera 18. FIG. 5 illustrates the camera assembly 10, shown in FIG. 4, in its operative relationship.

Figure 6:
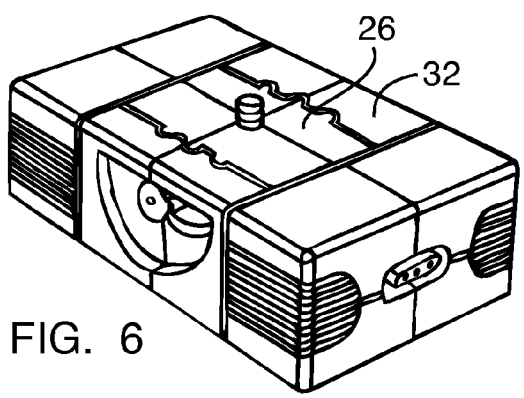
FIG. 6 illustrates the capturing of a camera mount in the battery assembly depicted in FIG. 4.

FIG. 6 shows the basic operation of the locking plates 32 and 33 as the camera mount 26 is captured therebetween via operation of the locking lever 33.

Figure 7:
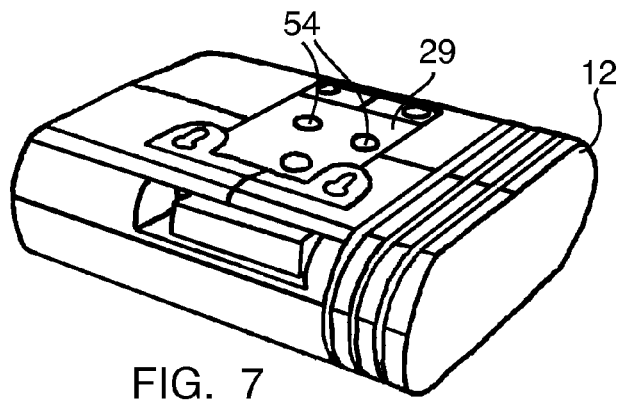
FIG. 7 illustrates a battery assembly having integral electrical terminals formed therein, according to another embodiment of the present invention.
Figure 8:
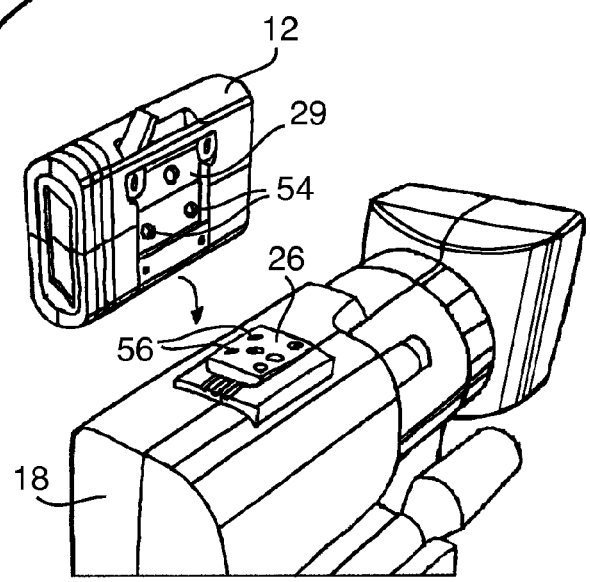
FIG. 8 illustrates the battery assembly of FIG. 7 being mounted to the a video camera assembly having electrical terminals disposed on the bottom, planar surface of the video camera assembly, in accordance with yet another embodiment of the present invention.
Figure 9:
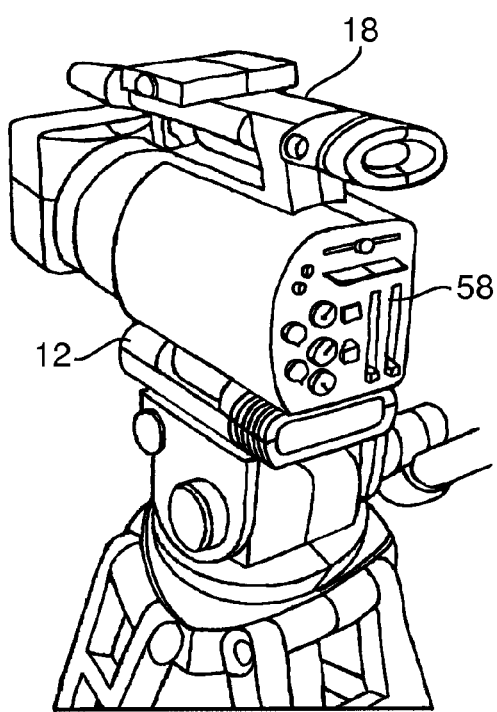
FIG. 9 illustrates is the video camera assembly for use with the battery assembly of FIG. 7.

Still yet another embodiment of the present invention is depicted in FIGS. 7-9. In contrast to the embodiments shown in FIGS. 1-6 where power was communicated from the battery assembly 12 to the video camera 18 via an integrated power adapter and cord 22, the embodiment of FIGS. 7-9 contemplates the direct transmission of electrical energy between these two devices.

As shown in FIG. 7, a plurality of active, and preferably spring loaded, electrical terminals 54 are formed in the depression 29 of the battery assembly 12. The terminals 54 communicate with matching electrical terminals 56 formed in the body of the camera mount 26, shown in FIG. 8 in its attached condition to the bottom, planar surface of the video camera 18. In operation, the electrical energy from the battery assembly 12 will be capable of direct communication with the video camera 18 via matching terminals 54 and 56.

It is therefore still yet another important aspect of the present invention that the battery assembly 12 is not only ergonomically disposed on the bottom, planar surface of the video camera 18, but that terminals 54 and 56 obviate the need for extraneous power adapters and cords in order to transmit electrical energy from the battery assembly 12 to the video camera 18. The present embodiment therefore eliminates the cumbersome power adapter and cord, and potential snags thereon, while reducing component parts for the camera assembly 10 as a whole.

Of course, the alternative embodiment shown in FIGS. 7-8 require that the video camera 18 also be modified from what is currently known in the art. That is, the present invention additionally contemplates a new configuration for video cameras in that instead of locating the battery terminals on the side or rear of a video camera (such as is known in the art and shown in FIGS. 1 and 5), the present invention envisions that the internal circuitry of the video camera 18 be reconfigured so as to reposition these terminals to the bottom, planar surface of the video camera 18. In doing so, the present invention frees up valuable space at the rear of the video camera for use in supporting new functions and/or controls 58, as shown in FIG. 9, as well as permitting the repositioning of known media inserts and/or function controls 58 in a manner that greatly increases their ease of use while enabling a level of user-observation not currently possible with known video cameras.

Figure 10:
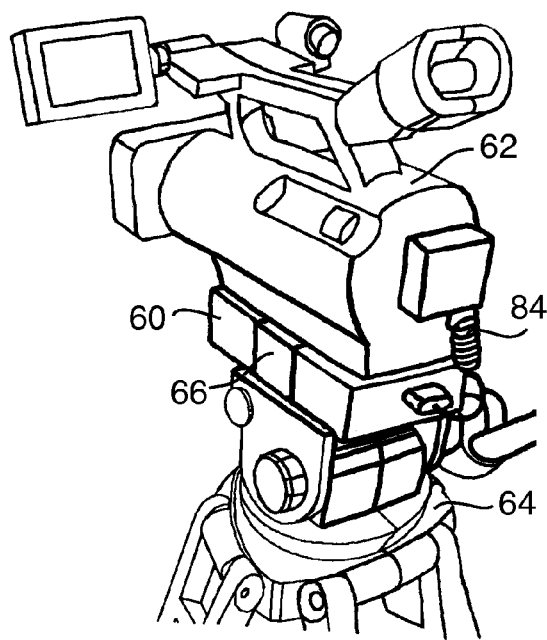
FIG. 10 illustrates a video camera assembly according to another embodiment of the present invention.
Figure 11:
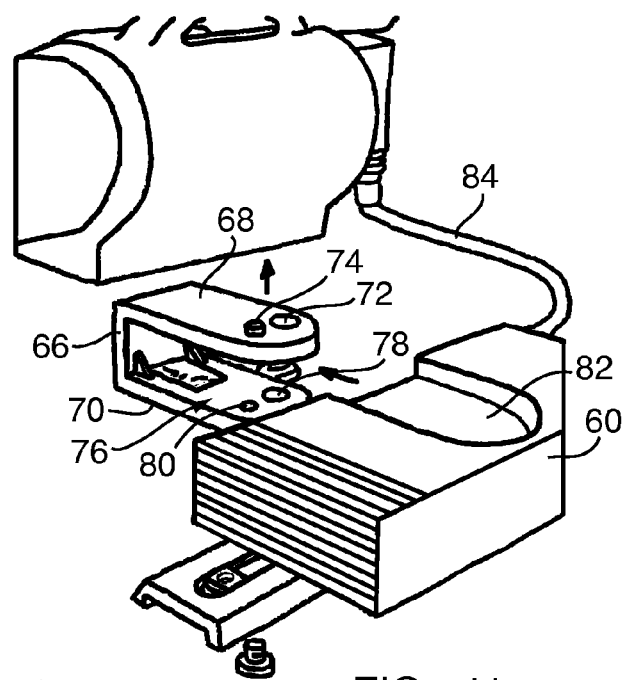
FIG. 11 illustrates a battery clip assembly having integral electrical terminals formed therein for enabling electrical communication with a matable battery assembly, according to another embodiment of the present invention.

FIG. 10 shows yet another embodiment of the present invention. As shown in FIG. 10, the battery assembly 60 is releasably and selectively disposed between the video camera 62 and the tripod 64 via a battery clip 66. As shown in FIG. 11, the battery clip 66 functions as a camera mount (similar to the camera mounts of the preceding embodiments) and includes a top bracket 68 and a bottom bracket 70. The top bracket 68 includes a threaded stud 72 and a location post 74 for mating with the threaded hole formed in the bottom, planar surface of the video camera 18 (similar to the attributes of the camera mount 26 shown in FIGS. 2 and 4).

The bottom bracket 70 defines a mounting area 76, which, in essence, takes the same general form as the known mounting structure typically defined on the bottom of known video cameras. That is, the mounting area 76 also includes a threaded bore 78 and a positioning hole 80 to accommodate the selective and releasable connection to a typical tripod, or the like.

Turning now to the battery assembly 60 in particular, FIG. 11 depicts a bracket depression 82 formed in the housing thereof. It should be noted that the bracket depression 82 is formed on both the upper half and lower half of the battery assembly 60, and is sized to closely-fit the top and bottom brackets, 68 and 70 respectively, when the battery assembly 60 is pushed between the top and bottom brackets, 68 and 70.

Although the bracket depression 82 has been described as being formed on both the upper half and lower half of the battery assembly 60, the present invention is not so limited in this regard as the bracket depression may alternatively be formed on only the upper half (that is, the half facing and in contact with the bottom, planar surface of the video camera 18) of the battery assembly 60, without departing from the broader aspects of the present invention.

It is an important aspect of the present invention that the bracket depressions 82 not only provide a close-fitting partner to the top and bottom brackets, 68 and 70, but that by being recessed into the housing of the battery assembly 60, the bracket depressions 82 ensure that the bottom, planar surface of the video camera 18 rests upon a large, substantially uniplanar area and is therefore more stable. That is, the bracket depressions 82 are formed to be of substantially the same depth as the brackets 68 and 70 are thick, therefore the bottom, planar surface of the video camera 18 experiences, in combination with the mounted battery assembly 60, a substantially continuous and planar surface upon which to rest when the video camera 18 is mounted to the battery clip 66.

Still yet another important aspect of the present invention lies in the ability of the battery clip 66 to permit the removal or replacement of the battery assembly 60 therefrom, all without ever having to threadedly disengage the video camera 18 from mechanical connection to the tripod 64. That is, once the battery clip 66 has been operatively connected (via its top and bottom brackets 68 and 70) to the video camera 18 and the tripod 64, a user of the video camera 18 need never structurally disengage the video camera 18 from the tripod 64 during replacement of the battery assembly 60. When replacement of the battery assembly 60 is desired, a user need only remove the battery assembly 60 from its friction or snap-fit orientation between the brackets 68 and 70, all without requiring the time consuming and often frustrating experience of disengaging the threaded fasteners of the system. Thereafter, replacement with a recharged battery assembly may likewise be easily accomplished by the mere insertion of another battery assembly 60 between the brackets 68 and 70, again without the need for any tooling, or operation of any threaded fasteners.

While the embodiment of FIGS. 10 and 11 illustrate the use of a power adapter and cord 84, the present invention is not limited in this regard. Indeed, similar to the embodiment disclosed in connection with FIGS. 7-9, the battery clip 66 may also support battery terminals on one, or both, of the top and bottom brackets, 68 and 70. These battery terminals formed in the top and bottom brackets 68 and 70 will communicate with similar, preferably spring loaded, terminals formed in the bracket depressions 82 of the battery assembly 60 for the purposes of transmitting electrical power from the battery assembly 60 to the video camera 62. Once again, the video camera 62 would also have to display battery terminals on the bottom, planar surface in order to facilitate the most efficient transfer of such electrical power.

Figure 12:
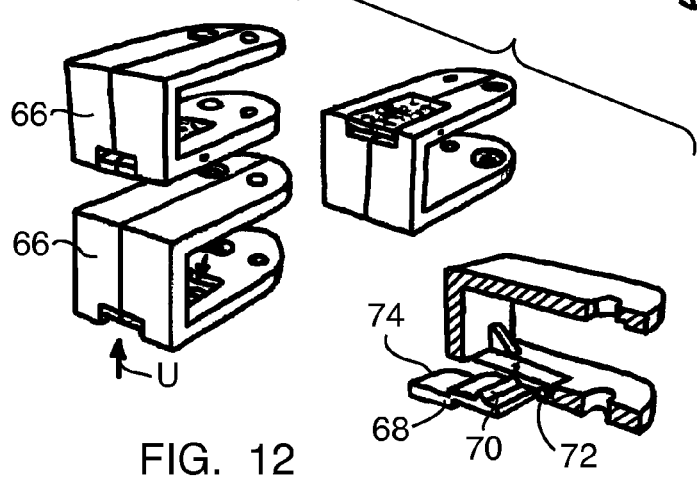
FIG. 12 illustrates multiple battery clips being cascaded together, in accordance with another embodiment of the present invention.

FIG. 12 shows another embodiment of the present invention, which builds upon the embodiment described in connection with FIGS. 10 and 11. As shown in FIG. 12, one or more battery clips 66 may be stacked in a serial, or cascading, manner, one on top of the other. In doing so, the present invention permits the positioning of several batter assemblies beneath the video camera 62.

The battery assembly 60 has been described as being in a friction or snap-fit orientation between the brackets 68 and 70. That is, one embodiment of the present invention is to design the battery clip 66 such that its close fitting nature in relation to the bracket depressions 82 provides enough of a frictional fit that the battery assembly 60 securely rests therein. The present invention also contemplates providing the battery clip 66 with a spring biased latch mechanism 68, shown in FIG. 12. The latch mechanism 68 shown in FIG. 12 includes an upwardly extending latch member 70 which is biased via a biasing coil spring 72, or the like, in a direction of contact with the battery assembly 60. The battery assembly 60 itself has a latch depression formed in the bottom half thereof, which communicates with the spring biased latch member 70 to secure the battery assembly 60 in the battery clip 66.

As further shown in FIG. 12, when the distal end 74 of the latch mechanism 68 is pressed upwards against the biasing force of the coil spring 72, in the general direction U, the latch member 70 will pivot and disengage from the latch depression formed in the bottom half of the battery assembly 60, thus freeing the battery assembly 60 to be removed from the battery clip 66.

Figure 13:
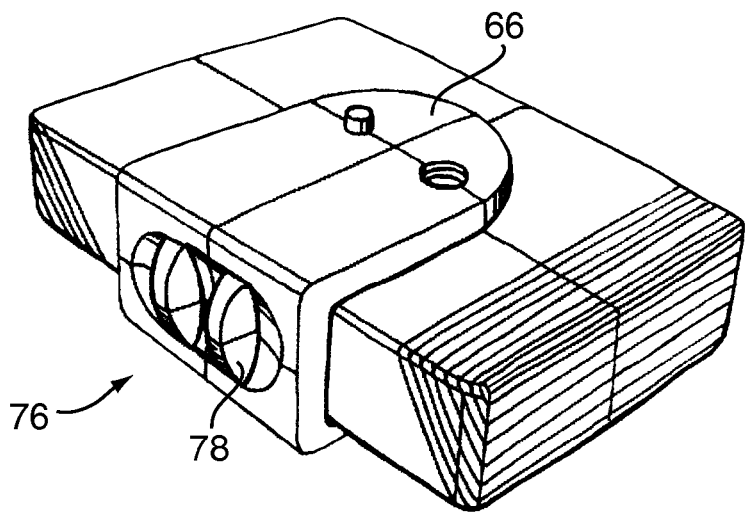
FIG. 13 illustrates a battery clip having a latching mechanism in accordance with another embodiment of the present invention.
Figure 13A:
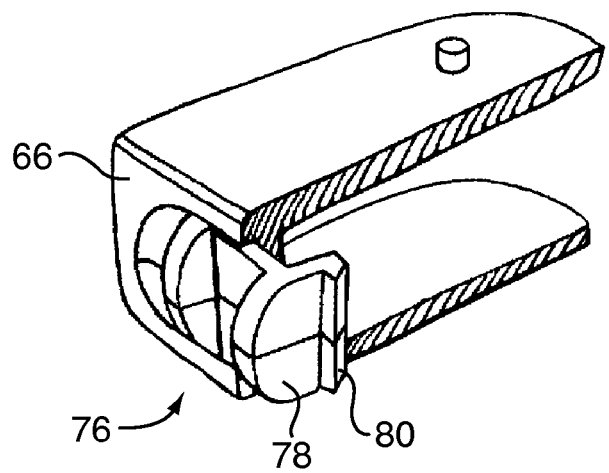
Figure 13B:
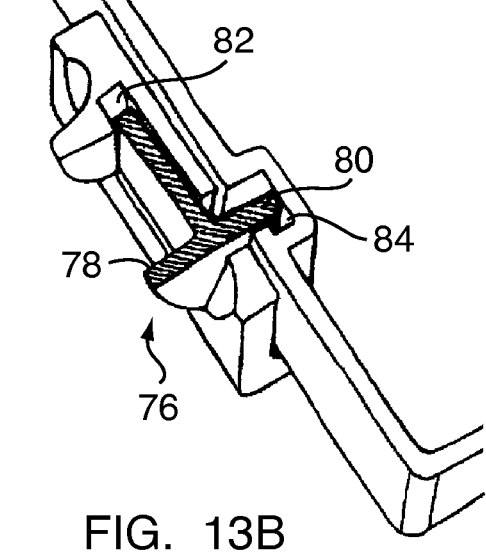

Still yet another embodiment of a latching mechanism may be attributed to the battery clip 66, as shown in FIGS. 13-13B. As depicted in FIGS. 13-13B, the battery clip 66 may alternatively be formed to include a latching mechanism 76 having a slidable, squeeze-style tab 78. The tab 78 itself includes a latch member 80 which is biased via a biasing leaf spring 82, or the like, in a direction of contact with a latching cavity 84 formed in the rear of the battery assembly 60. Upon squeezing the tab 78, the latch member 80 will disengage from the latching cavity 84, thus freeing the battery assembly 60 to be removed from the battery clip 66.

In consideration of the embodiments discussed in connection with FIGS. 10-13, it will be readily appreciated that in the case where the electrical power from the battery assembly 60 to the video camera 62 is accomplished with a power adapter and cord 84, the inclusion of multiple, stacked battery assemblies permits a user to almost instantaneously change from one battery assembly to the other, all without ever having to threadedly disengage the video camera 62 from the tripod 64. Still further, in those cases where the battery clip 66 is equipped with battery terminals, it would be possible to cascade the electrical power from multiple battery assemblies to the video camera 62, without any extraneous wires, in a manner not heretofore known in the art.

Figure 14:
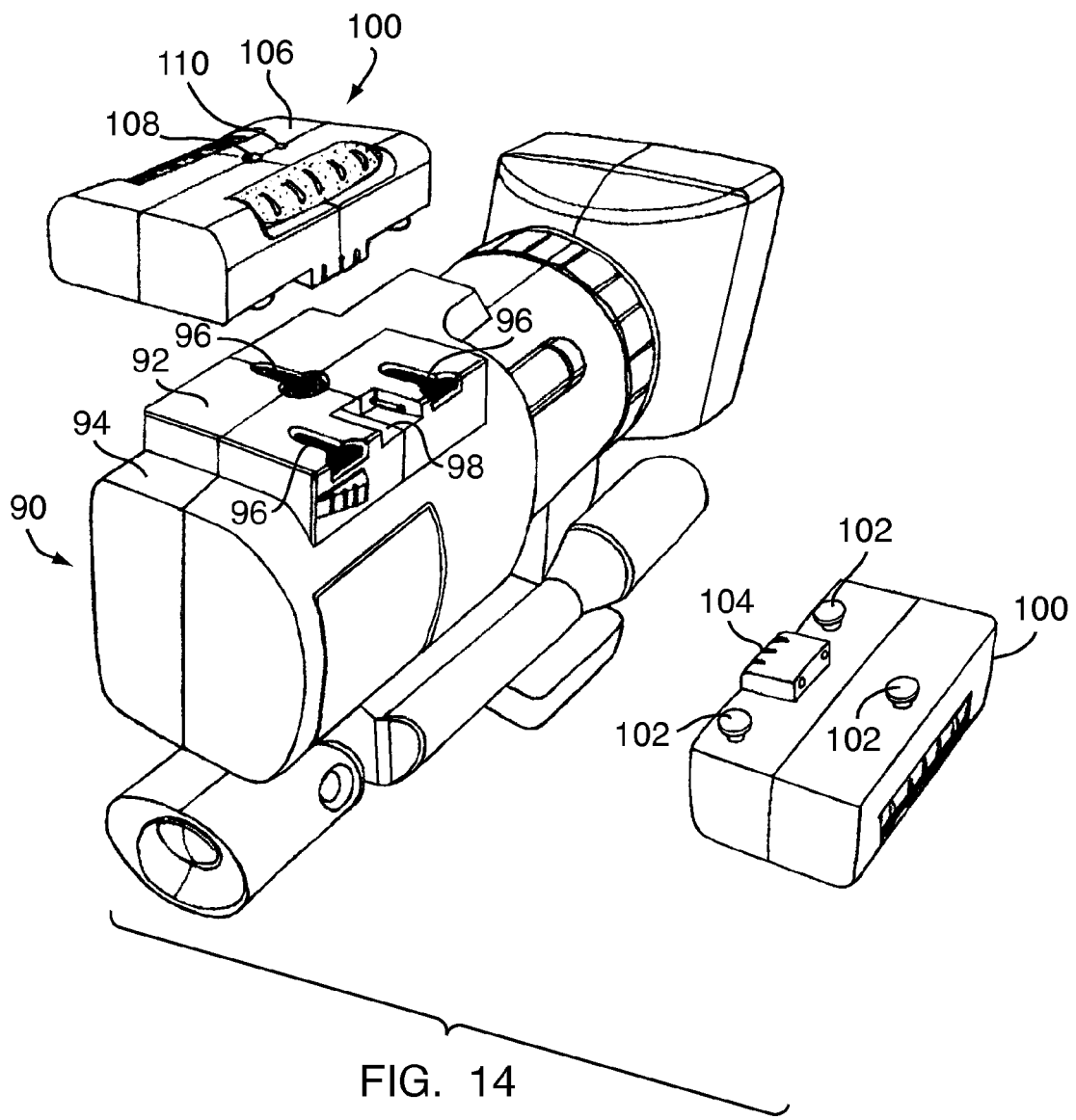
FIG. 14 illustrates a video camera assembly according to another embodiment of the present invention.

FIG. 14 yet another embodiment of the present invention. As shown in FIG. 14, a video camera 90 may have a mounting block 82 defined on the bottom, planar surface 94 of the video camera 90. The mounting block 90 may itself include structural mounting fixtures 96, as well as electrical terminals 98, for providing electrical and structural communication with a battery assembly 100. As further shown in FIG. 14, the battery assembly 100 includes mounting posts 102, which operatively match with the mounting fixtures 96 formed in the mounting block 92. Moreover, the battery assembly 100 also includes an electrical terminal block 104 capable of accommodating the electrical terminals 98, for communicating electrical power from the battery assembly 100 to the video camera 90.

The battery assembly 100 further defines a mounting area 106, which, in essence, takes the same form as the known mounting structure typically defined on the bottom of known video cameras. That is, the mounting area 106 includes a threaded bore 108 and a positioning hole 110 to accommodate the selective and releasable connection to a typical tripod.

It is therefore another important aspect of the present invention that, whichever disclosed embodiment is utilized, one half of the battery assembly defines a mechanism or structure to permit the selective and releasable attachment of the battery assembly to the bottom, planar surface of the video camera, while the other half of the battery assembly defines a mechanism or structure to permit the selective and releasable attachment of the battery assembly to a tripod, or the like.

By designing the battery assembly to have opposing halves, each half being individually adapted to utilize the known attachment means existing on known video cameras and tripods, the present invention provides for the ergonomic mounting of a battery assembly to the bottom, planar surface of a video camera without sacrificing the ability of the video camera to be mounted upon a tripod, or the like.

Figure 15:
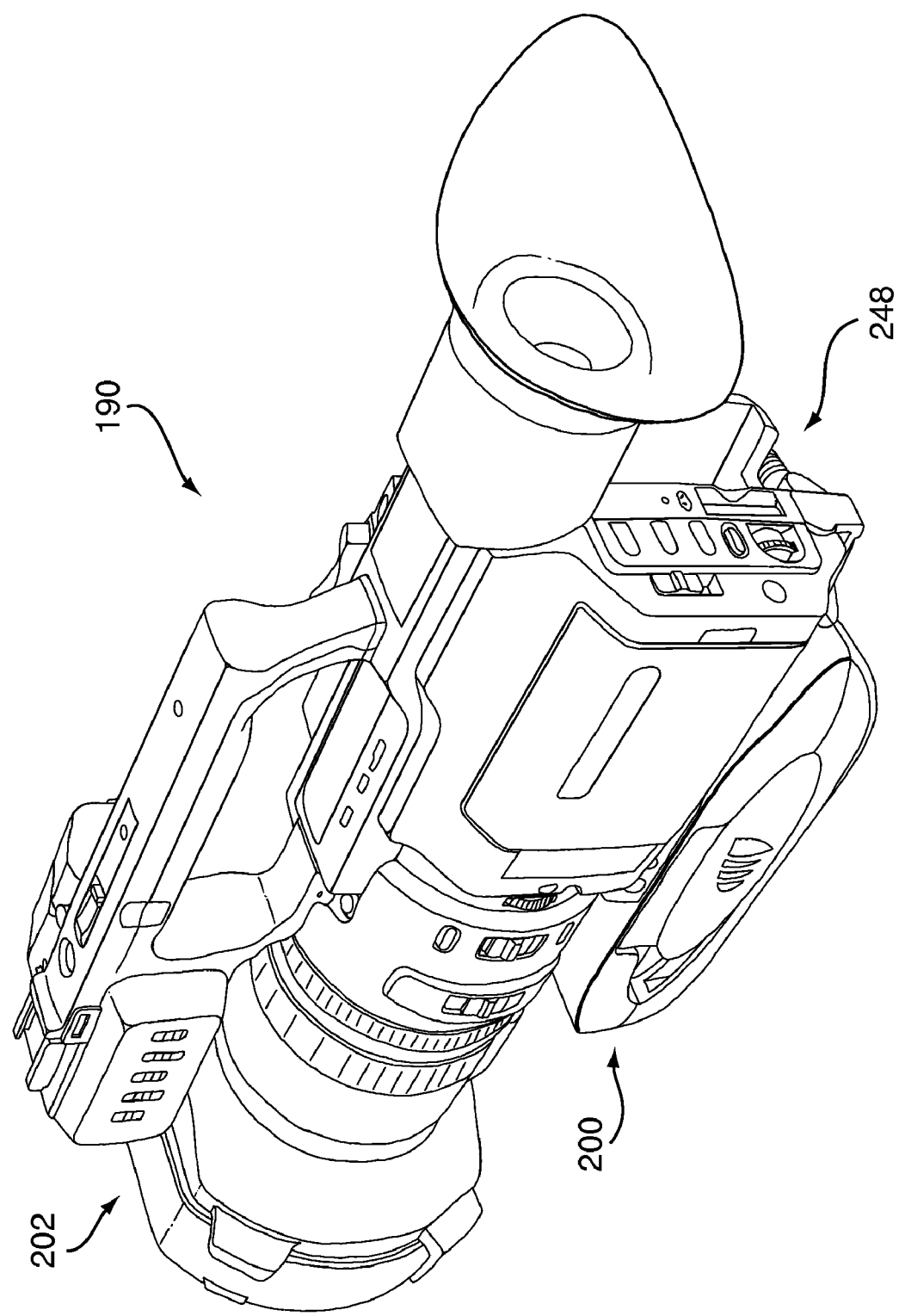
FIG. 15 illustrates a video camera assembly according to another embodiment of the present invention.
Figure 16:
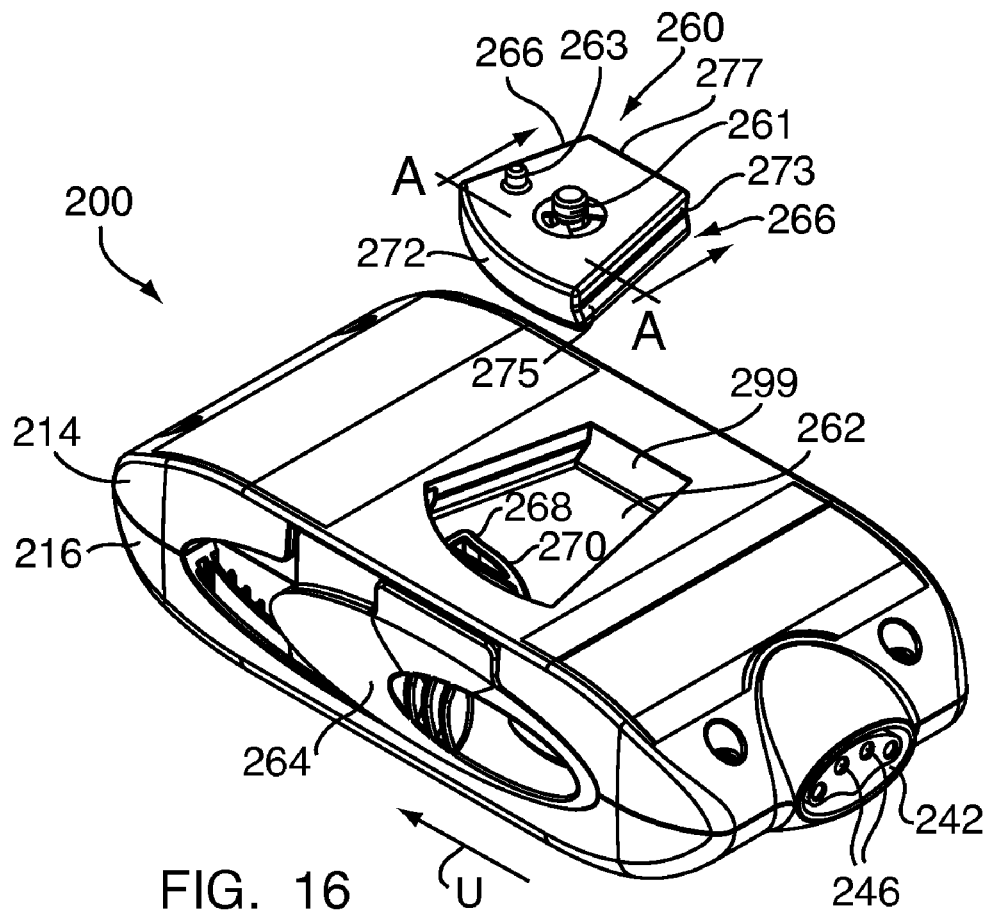
FIG. 16 illustrates the battery assembly and the camera mounting plate utilized in the video camera assembly of FIG. 15.

FIGS. 15-21 illustrates a video camera assembly 190 according to a preferred embodiment of the present invention. As best seen in FIGS. 15 and 16, the video camera assembly 190 includes a battery assembly 200 having a housing comprised of an upper first half 214 and a lower bottom half 216. Together, the matable upper half 214 and lower half 216 define an inner chamber for accommodating one or more energy cells therein. A printed circuit board may also be located within the inner chamber, and operatively connected to the energy cells, to be utilized in a known fashion to assist in the management of the power cells, or the like.

As discussed previously, the energy cells are preferably rechargeable lithium ion batteries, or the like, however the present invention is not so limited in this regard as the energy cells may alternatively be any type or manner of portable power cells, including fuel cells, without departing from the broader aspects of the present invention.

Returning to FIG. 15, the battery assembly 200 is selectively and releasably connected between a video camera 202 and an unillustrated tripod assembly, similar to the configuration of FIG. 1. It should be appreciated that although the battery assembly 200 has been described as being operatively positioned between a video camera 202 and a tripod assembly, the present invention is not so limited in this regard as the present invention may be mounted to any electrical device, regardless of its nature, that is equipped with a matching threaded bore and a positioning hole, without departing from the broader aspects of the present invention.

Similar to the previously discussed embodiments, the battery assembly 200 is selectively and releasably mounted to both an electronic device, such as but not limited to the video camera 202, as well as a tripod assembly. The battery assembly 200 is releasably fixed to the bottom, planar surface of the video camera 202 and greatly increases the ergonomic configuration of the camera assembly 190 as a whole. That is, by locating the weight of the battery assembly 200 directly beneath the video camera 190, as opposed to extending outwardly therefrom as in known video camera systems, the present invention avoids the creation of any unintended and undesirable moments to the video camera 202. Indeed, the weight of the battery assembly 200 works in concert with the attachment mechanisms to seat the video camera 202 more firmly and with greater stability than would otherwise be possible if the battery assembly 200 were extending outwardly from the video camera.

As further shown in FIG. 16 is a power adapter and cord 220 which is operatively and electrically connected between the video camera 202 and the battery assembly 200, and provides operating power from the battery assembly 200 to the video camera 202 and its various accessories. As shown in FIG. 16, the power adapter and cord 220 includes a right angle connector 240 for effectuating the electrical connection with the battery assembly 200. It will readily be appreciated that the right angle connector 240 resists disengagement from the housing of the battery assembly 200 should the power adapter and cord 220 be pulled via its cord portion.

Figure 18:
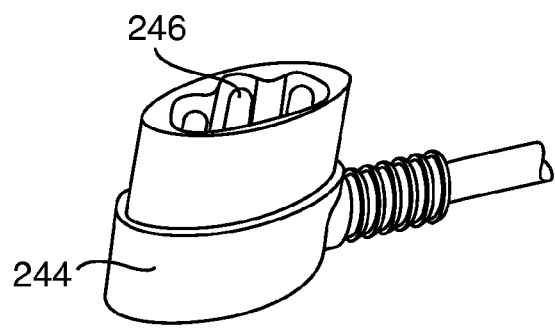
FIG. 18 is a reverse-angle view of the plug portion of the adapter and power cord assembly.

The power adapter and cord 220 is designed to releasably mate with a power receptacle 242 formed in the housing of the battery assembly 200, as best seen in FIG. 16. Both the receptacle 242 and the plug portion 244 of the adapter and power cord 220 define multiple electrical conductors/pins 246 to provide for various operating requirements, such as but not limited to battery charging, battery discharging (either to the video camera 202 or another accessory device), data input/output, and the like. FIG. 18 illustrates a reverse-angle view of the plug portion 244 of the adapter and power cord 220 in which the multiple pins 246 are shown.

The power adapter and cord 220 of the present invention is adapted to releasably mate to the existing battery terminals typically formed on the back or sides of known video cameras. FIG. 15 depicts a typical battery mounting area 248 in the rear wall/side of the video camera 202, while FIG. 19 illustrates the housing 250 of the adapter portion of the adapter and power cord 220.

Figure 19:
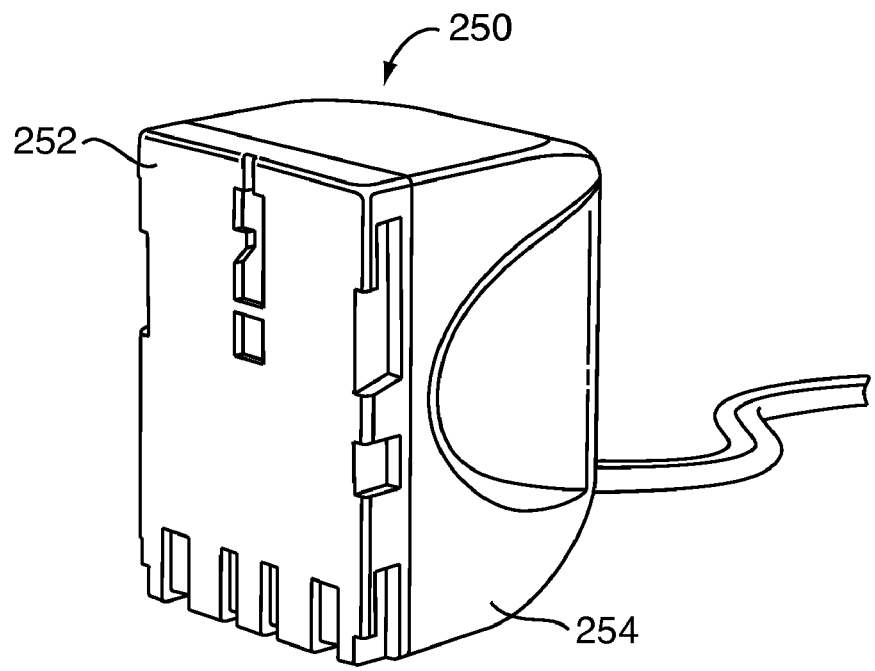
FIG. 19 illustrates the two piece power adapter.
Figure 20:
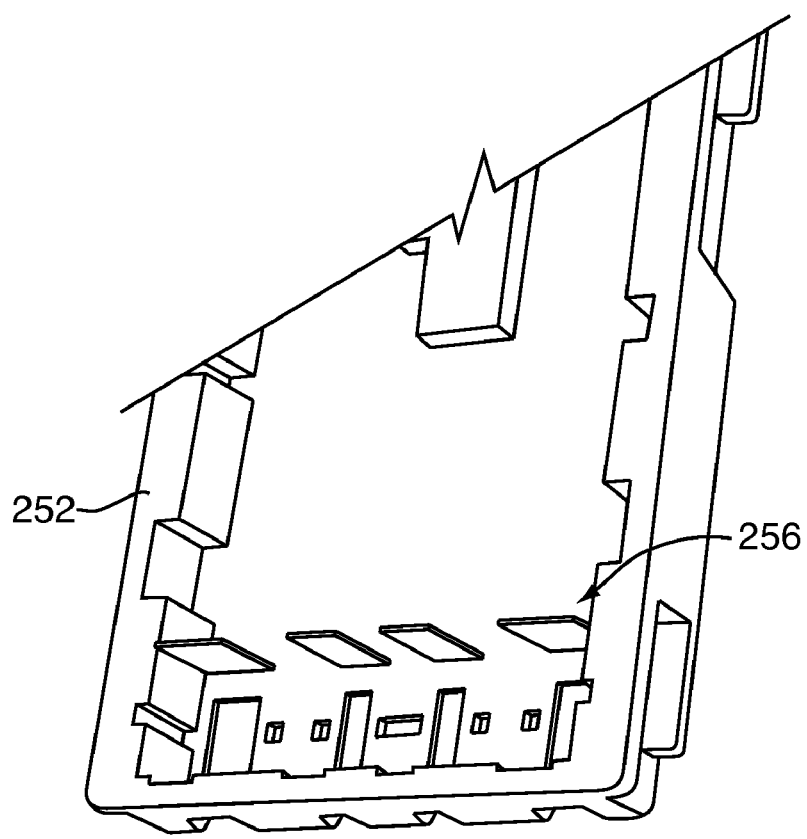
FIG. 20 illustrates a partial back-side view of one half of the two piece power adapter.

As shown in FIG. 19, the housing 250 is preferably formed as two halves, a first half 252 and an integrally mated second half 254. The first and second halves, 252 and 254 respectively, may be selectively disengageable from one another, thereby enabling the removal of the second half 254 from the video camera 202 during transportation or the like, while leaving the first half 252 attached to the video camera 202 in area 248. In this manner, the present invention permits the power cord and adapter 220 to be quickly and easily attached or detached from the video camera 202. FIG. 20 is a partial view of the inside of the first half 252 of the housing 250, in which molded in electrical contacts 256 are shown.

Returning to FIGS. 16 and 17, a camera mount 260 is shown which is utilized to selectively and releasably connect the battery assembly 200 to the video camera 202. The camera mount, or mounting plate, 260 includes a threaded post 261 and a locating pin 263, and therefore may be selectively mounted to any electrical device, and in particular a video camera, that itself defines matching mounting means for the threaded post 261 and the locating pin 263.

Figure 17:
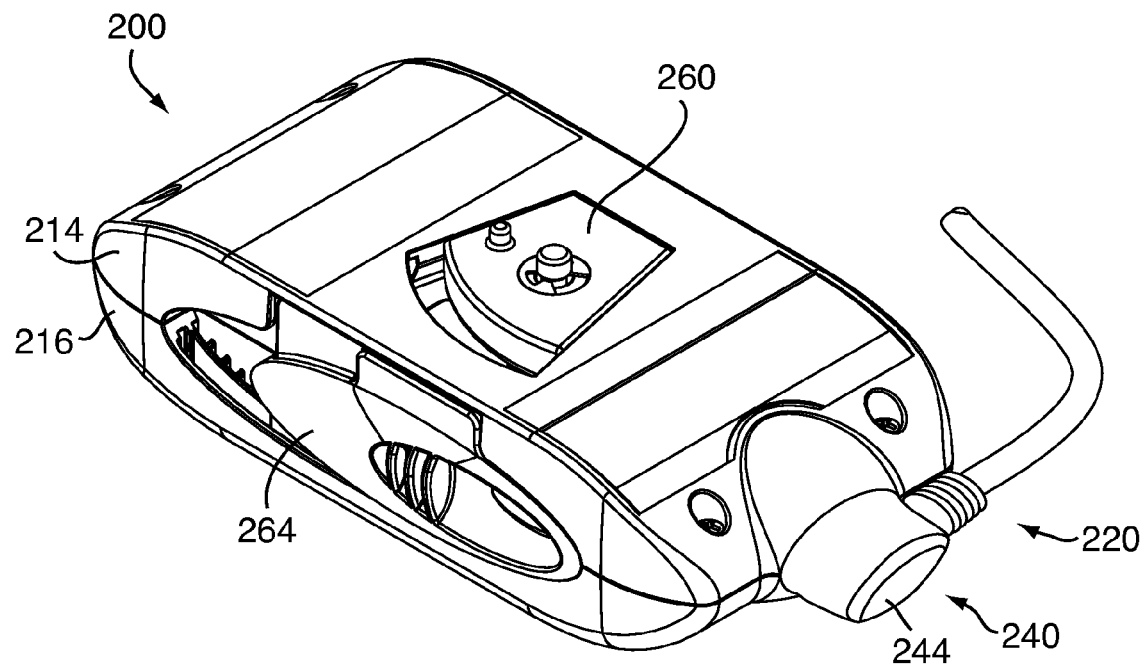
FIG. 17 illustrates the battery assembly of FIG. 16 with the mounting plate in its secured position.

As shown in FIGS. 16 and 17, the camera mount 260 comprises a low-profile plate which may be releasably and securely fixed into a close-fitting depression 262 formed in the upper first half 214 of the battery assembly 200 via the operation of a spring biased actuation slide 264. To assist in the selective fixing of the camera mount 260 to the battery assembly 200, the low-profile plate includes chamfered or dove-tailed edges 266 that work in concert with matching edges of the depression 262.

Figure 16A:
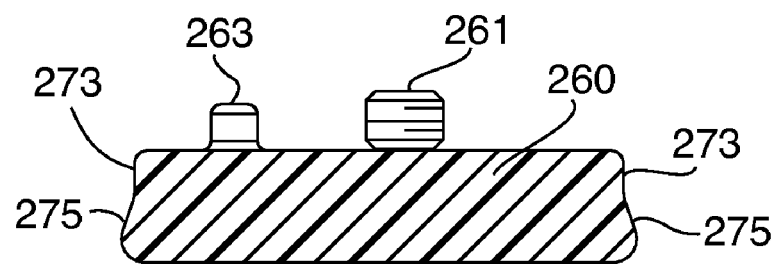
FIG. 16A illustrates a cross-sectional view of the mounting plate, in accordance with one embodiment of the present invention.

FIG. 16 illustrates that the dove-tailed edges 266 of the mounting plate 266 have a compound profile. That is, as shown in FIGS. 16 and 16A, the dove-tailed edges 266 each include an upper and a lower inwardly sloped side, 273 and 275 respectively, while the depression 262 includes sidewalls having a matching profile. Still further, the mounting plate 260 defines a rear back-beveled side wall 277, which slopes downwardly and inwardly from the top surface of the mounting plate 260. The back-beveled side wall 277 slides along a rear wall 279 of the depression 262 so as to facilitate ease of integration between the mounting plate 260 and the depression 262.

Once inserted into the depression 262, the mounting plate 260 is secured therein via the contoured edges 266 acting in concert with the frictional force of a locking cam 268. When the actuation slide 264 is moved in a direction U against its spring biasing force, the locking cam 268 will retreat out of the depression 262 and into the housing of the battery assembly 200, thereby permitting the mounting plate 260 unfettered access to the depression. Once situated therein, an operator would release the actuation slide 264, thereby permitting the locking cam 268 to reassert its position within the depression 262. As the profile 270 of the locking cam 268 abuts the face 272 of the mounting plate 260, the mounting plate 260 will become fixed and nested within the depression until the actuation slide 264 is again moved in the direction U.

Similar to the other embodiments discussed previously, it is another important aspect of the present invention that the close-fitting depression 262 is sized to substantially match the thickness of the camera mount 260. That is, when secured within the close-fitting depression 262, the top, exposed surface of the camera mount 260 is substantially flush with the upper first half 214 of the battery assembly 200. Thus, the bottom, planar surface of the video camera 202 enjoys an expansive mounting surface that includes not only the camera mount 260, but also the entire area of the upper first half 214 of the battery assembly 200. Stability and of the video camera 202 is thereby dramatically increased.

Given that the camera mount 260 itself includes the same typical mounting apparatus as is commonly found on known tripods, including the threaded post 261 and a location pin 263, it will therefore be readily appreciated that the camera mount 260 may be selectively and releasably connected to the bottom, planar surface of any known video camera in the same manner as conventional video cameras are connected to conventional tripods.

Indeed, it is another important aspect of the present invention that the means for attaching the video camera 202 to the battery assembly 200 makes use of the conventional threaded bore formed in the bottom, planar surface of known video cameras, thus making the present invention usable by all known video cameras (as well as all known still cameras and other image recording devices, binoculars and the like) currently on the market without requiring any structural alteration thereof. Moreover, as the underside of the camera mount 260 is itself a planar surface, any video camera equipped with the camera mount 260 may still be placed upon a support surface, ground or the like, after the camera mount 260 is disengaged from the battery assembly 200 (via operation of the actuation slide 264). Thus, the camera mount 260 of the present invention not only enables the selective mating of the video camera 202 with the battery assembly 200, but does so in a manner that does not destroy the ability of the video camera 202 to be utilized as a stand-alone piece of equipment.

It is still yet another important aspect of the present invention that the camera mount 260 permits the quick-release of the video camera 202 from the battery assembly 200 without the necessity of unscrewing the threaded post 261. In this regard, it will be appreciated that operation of the actuation slide 264 permits the camera mount 260 to disengage from the battery assembly 200 in a quick and easy fashion, thus speeding battery replacement time.

Figure 21:
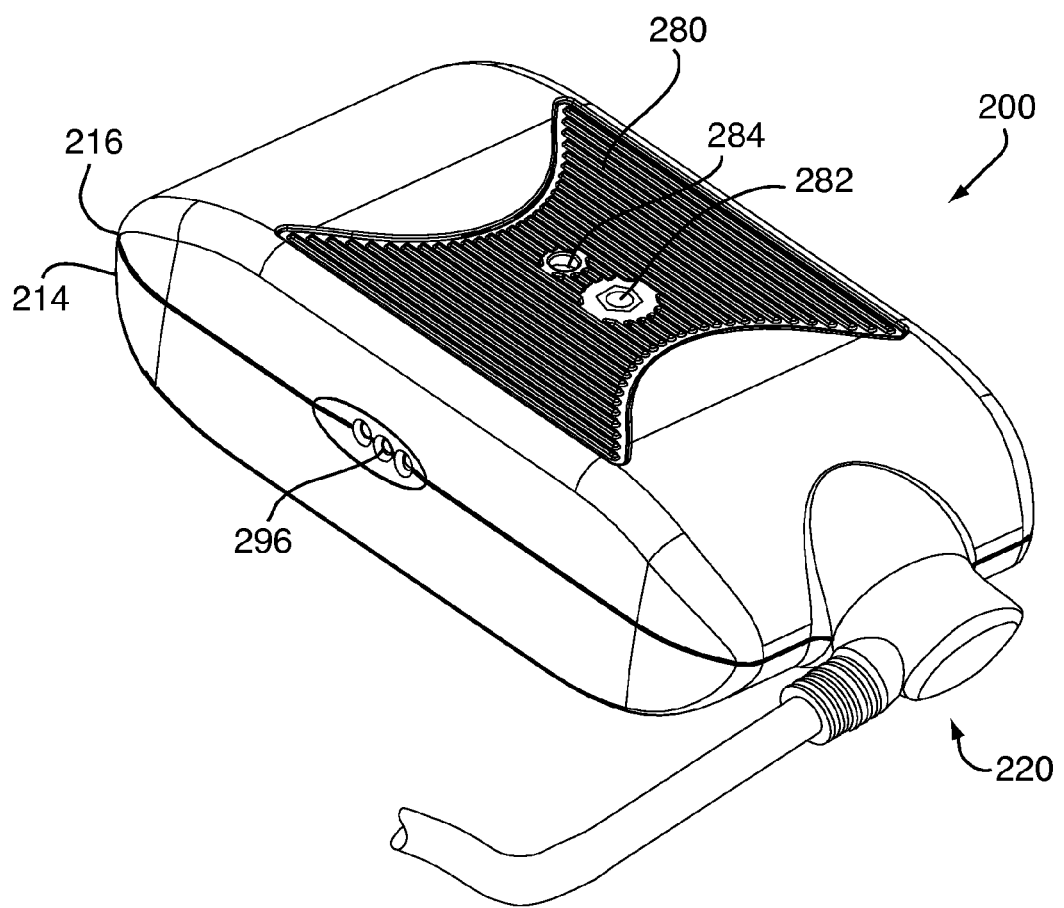
FIG. 21 illustrates the bottom of the battery assembly of FIG. 16.

Turning now to FIG. 21, the lower second half 216 of the battery assembly 200 is now depicted in greater detail. As shown in FIG. 21, the second (or bottom) half 216 of the battery assembly 200 is formed to define a mounting area 280 which, in essence, takes the same form as the known mounting structure typically defined on the bottom of known video cameras. That is, the mounting area 280 also includes a threaded bore 282 and a positioning hole 284 to accommodate the selective and releasable connection to a typical tripod, or the like.

FIG. 21 further depicts a series of visual indicators 286 defined in a side of the battery assembly 200. The visual indicators 286 are preferably LEDs and serve to indicate to a user the status of the power cells housed within the battery assembly 200. Location of the visual indicators 286 on the side of the battery assembly 200 ensures that when the battery assembly 200 is mounted between a video camera and a tripod, the operator can still view the visual indicators 286. While three, preferably LED-type, visual indicators 286 are shown in FIG. 21, it will be appreciated that any number or type of indicator may be alternatively utilized without departing from the broader aspects of the present invention. Moreover, the nature of the information communicated by the visual indicators 286 is not itself limited in any way, and will change in dependence upon the nature of the content within the battery assembly 200, whether that content is power cells of some type, or a DVD/CD disk drive, or the like.

Similar to the embodiment of FIGS. 7-8, the embodiment shown in FIGS. 15-21 may also include a plurality of electrical contacts formed in and through the mounting plate 260. In this manner, and provided the video camera (or other electrical device) has defined thereon matching electrical contacts, the mounting plate 260 will transmit electrical power directly to the underside of the video camera, without the need for any adapter or power cord. Indeed, the present invention envisions that electrical contacts formed on the mounting plate 260 can supply the video camera 202 with operating power, while the battery assembly 200 also communicates additional power to various accessory devices (photographic lights, click drives, or the like) via the receptacle 242. In this manner, several electrical devices can be powered from a single battery assembly 200. Still further, more than one battery assembly 200 may be cascaded atop one another and captured as a group between a video camera and a tripod, each of the battery assemblies powering the same or differing electrical devices and accessories, as discussed above.

It will therefore be readily appreciated from a review of FIGS. 15-21 in combination that the present invention is capable of not only mounting any known video camera to any known tripod assembly in a manner heretofore unknown in the art, but does so in a manner that utilizes the known and unaltered structures of both the video camera 202 and any known tripod. Moreover, removal of the camera mount 260 and the battery assembly 200 is easily facilitated, and may be readily accomplished if a user desired to mount the video camera 202 directly to a tripod.

The present invention therefore proposes a power supply for video cameras that not only stabilizes (rather than destabilizing) the video camera to which it is attached, but also completely reforms the video camera industry. That is, the concept of placing battery assemblies beneath the bottom, planar surface of a video camera completely frees the rear and side of the video camera for greater functionability than ever before. Still further, by equipping the battery assembly with, preferably, spring biased battery terminals, and by forming matching battery terminals on the bottom, planar surface of the video camera itself, the present invention completely eliminates the necessity of having extraneous power cords.

Moreover, by adding one or more battery assemblies 10 to a camera, and in particular by adding these additional battery assemblies 10 to the bottom, planar surface of a video camera, the present invention advantageously affects the ergonomics of the camera itself. The weight of the connected battery assemblies 10 is low and substantially located at the center of mass of the camera, as opposed to extending outwardly from the camera body as in known devices. Moreover, by adding cascaded battery assemblies 10 to the bottom of a video camera, the present invention increases the overall weight of the camera to a varying amount, thereby assisting in the reduction of hand tremble, while increasing the ability of an operator to accomplish smooth transition, tilt and pan operations.

It is yet another important aspect of the present invention that electrical contacts be formed on the bottom, planar surface of a video camera. More particularly, the present invention contemplates utilizing that portion of a video camera historically reserved solely for mounting upon a tripod or other support platform. By placing the location of the battery contacts upon this bottom, planar surface of a camera, the present invention not only facilitates the productive use of the additional weight afforded by the battery assemblies 10 (as discussed above), but also permits the redesign of new cameras. That is, by removing battery contacts from the rear or side of camera housings, where they typically exist, this space may be utilized to provide other functions to the camera operator.

It will be readily appreciated that the battery assembly also preferably houses rechargeable lithium ion batteries, or the like, as well as providing an electrical plug connector for providing corded power supply to an accessory device of the camera itself.

Regardless of the chosen embodiment, the present invention provides a mechanical mounting means for the cascading and connection of multiple battery assemblies to a camera or tripod system, without sacrificing ease of operation or causing unwieldy weight distribution.

The present invention also vastly increases the possible portable power capacity of known camera systems, but does so in a manner that increases the operability of the system as a whole.

Still further, by arranging the electrical battery power for a video camera on the bottom planar surface of the video camera, the present invention not only provides for a non-corded manner of electrically connecting multiple, cascaded battery assemblies directly to the camera and/or tripod, but also permits for the complete redesigning of known camera controls, grips and displays. Together, the redesigned bottom of a video camera, and the discussed mechanical mounting means formed in the housing of a battery assembly, provide for a substantial increase in the functionality and operability of known video camera systems.

As discussed herein, the embodiments depicted in FIGS. 1-21 are adapted to suspend a battery assembly beneath an electrical device, such as an image recording device. Moreover, the present invention enables the placement of power cells beneath a video camera without destroying the ability of the video camera to easily mount to a known support apparatus, tripod or the like. The present invention, however, is not so limited in this regard. Indeed, the present invention equally contemplates that in lieu of power cells, a DVD/CD disk drive, data device or the like may instead be releasably suspended beneath a video camera via the mounting plate and housing discussed previously.

It can therefore be envisioned that a video camera system utilizing the present invention could conceivably have a first battery assembly attached to the underside of the video camera, and then cascaded thereunder could be suspended a DVD disk drive, and then a second battery assembly, all of which are captured between the video camera and a tripod device. The first battery assembly, the DVD disk drive and the second battery assembly would all be in electrical communication with one another, if desired, and provided the various mounting plates associated with each housing included integral electrical contacts (similar to the embodiment of FIGS. 7 and 8). Even if the various housings did not have integral electrical contacts in their respective mounting plates, the DVD disk drive could conceivably be powered by the second battery assembly, while the video camera or lights could be powered by the first battery assembly.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A battery assembly for providing a quick release between an image recording apparatus and a structural support apparatus, said battery assembly comprising:
    a housing having a first outer surface and a second outer surface, said first surface and said second outer surfaces being on opposing sides of said housing;
    a threaded bore defined on said second outer surface;
    a depression formed in said first outer surface;
    an energy cell disposed within said housing;
    a mounting plate releasably secured within said depression, said mounting plate having a thickness substantially equal to a depth of said depression and including a threaded post formed thereon; and
    a latching means in operative communication with said depression, wherein manual operation of said latching means releasably secures said mounting plate within said depression;
    wherein said mounting plate is substantially coplanar with said first outer surface when said mounting plate is mounted within said depression; and
    wherein operation of said latching means causes a locking cam to selectively protrude into said depression and bear upon said mounting plate, thereby securing said mounting plate in said depression.

2. The battery assembly for providing a quick release between an image recording apparatus and a structural support apparatus according to claim 1, wherein:
    said battery assembly includes a visual indicator for communicating a predetermined characteristic of said energy cell.

3. The battery assembly for providing a quick release between an image recording apparatus and a structural support apparatus according to claim 1, wherein:
    said mounting plate includes an electrical communication means for communicating electrical power of said energy cell through said mounting plate and to said image recording apparatus.

* * * * *